(12) United States Patent
Lafond et al.

(10) Patent No.: US 8,391,673 B2
(45) Date of Patent: Mar. 5, 2013

(54) METHOD, SYSTEM, AND APPARATUS TO DERIVE CONTENT RELATED TO A MULTIMEDIA STREAM AND DYNAMICALLY COMBINE AND DISPLAY THE STREAM WITH THE RELATED CONTENT

(75) Inventors: Kenneth G. Lafond, Brier, WA (US); Badarinath N. Kommandur, Beaverton, OR (US); Prashant Gandhi, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 758 days.

(21) Appl. No.: 12/459,137

(22) Filed: Jun. 26, 2009

(65) Prior Publication Data

US 2010/0329633 A1    Dec. 30, 2010

(51) Int. Cl.
*H04N 9/80*    (2006.01)
(52) U.S. Cl. .................................................. 386/241
(58) Field of Classification Search .................. None
See application file for complete search history.

(56) References Cited

U.S. PATENT DOCUMENTS

| 7,228,556 | B2 | 6/2007 | Beach |
| 2002/0019833 | A1* | 2/2002 | Hanamoto ............... 707/500 |
| 2007/0162459 | A1* | 7/2007 | Desai et al. .............. 707/10 |
| 2007/0204319 | A1* | 8/2007 | Ahmad et al. ............ 725/134 |
| 2008/0005668 | A1* | 1/2008 | Mavinkurve et al. ..... 715/526 |
| 2009/0063966 | A1 | 3/2009 | Ennals |
| 2009/0076897 | A1 | 3/2009 | Ennals |

\* cited by examiner

*Primary Examiner* — Huy T Nguyen
(74) *Attorney, Agent, or Firm* — Barnes & Thornburg LLP

(57) ABSTRACT

A method, system, and apparatus are disclosed. In one embodiment method includes receiving multimedia data from a source device. Then the method determines one or more pieces of content information from the received multimedia data through a content awareness algorithm. Next, the method searches one or more data repositories for relational information associated with the content information. Then the method retrieves any found relational information from the one or more data repositories. Finally, the method displays the retrieved relational information alongside the multimedia data on a display device.

24 Claims, 6 Drawing Sheets

METHOD, SYSTEM, AND APPARATUS TO DERIVE CONTENT RELATED TO A MULTIMEDIA STREAM AND DYNAMICALLY COMBINE AND DISPLAY THE STREAM WITH THE RELATED CONTENT

FIELD OF THE INVENTION

The invention relates to retrieving content from a multimedia stream and using the content to find additional data to combine with the stream.

BACKGROUND OF THE INVENTION

Television, video, and other multimedia program viewings have become more dynamic and ubiquitous among a host of environments. Current technology allows multimedia data including movies, news, and sporting events to be streamed directly to a display almost anywhere on the planet. Cable television backbones, satellite broadcasts, high-speed Internet connections, cell phone networks, and other means of transmitting multimedia streams are able to be received by many different types of devices such as televisions, smart phones, and laptop computers. Additionally, digital video recorders (DVRs) allow these streams to be saved instantaneously and to be played back at a later time. Current multimedia stream viewing services let a user play video, music, or photo media stored on a server hard drive or on the Internet at the user's request. These services do not comprehend the content behind what a user is watching and have no notion of what other media the user is interested in viewing.

Intel® Corporation has a product called Mash Maker which is a web browser extension. Mash Maker lets users easily create client-side mashups. Mashups are a combination of useful pieces of information about topics created on-the-fly as a user browses the web. Mash Maker uses context-aware and inference engines to suggest new mashups of websites based on a user's areas of interest, preferences, and the environment. Mash Maker lets users combine information from a multitude of web sites, visualize, and transform content in many new ways to fit their style.

BRIEF DESCRIPTION OF THE DRAWINGS

The present invention is illustrated by way of example and is not limited by the drawings, in which like references indicate similar elements, and in which.

DETAILED DESCRIPTION OF THE INVENTION

Embodiments of a method, system, and apparatus to derive content related to a multimedia stream and dynamically combine and display the stream with the related content are described.

A multimedia stream provided from a cable or satellite provider saved in a mass storage drive or retrieved from a file stored in another storage medium is received to a source device (e.g. a set top box for a television). The multimedia stream is passed through one or more content awareness algorithms to determine one or more pieces of content within the stream. For example, the content awareness algorithm may be able to determine the stream is related to World War II history.

Logic related to the content awareness algorithm may take the content information retrieved from the stream and utilize the information to do a search for additional information related to the stream. The search may be performed using one or more keywords or other content information retrieved from the stream. Any retrieved additional related information ("relational information") may then be displayed with the multimedia stream. This additional information displayed may take place dynamically if the stream is being retrieved and displayed from the provider in real-time. Otherwise, the information can be displayed at a later time when a saved version of the stream is displayed. Relational Information could also be aggregated in a device or as a service for offline viewing at a later time.

Figure 1:
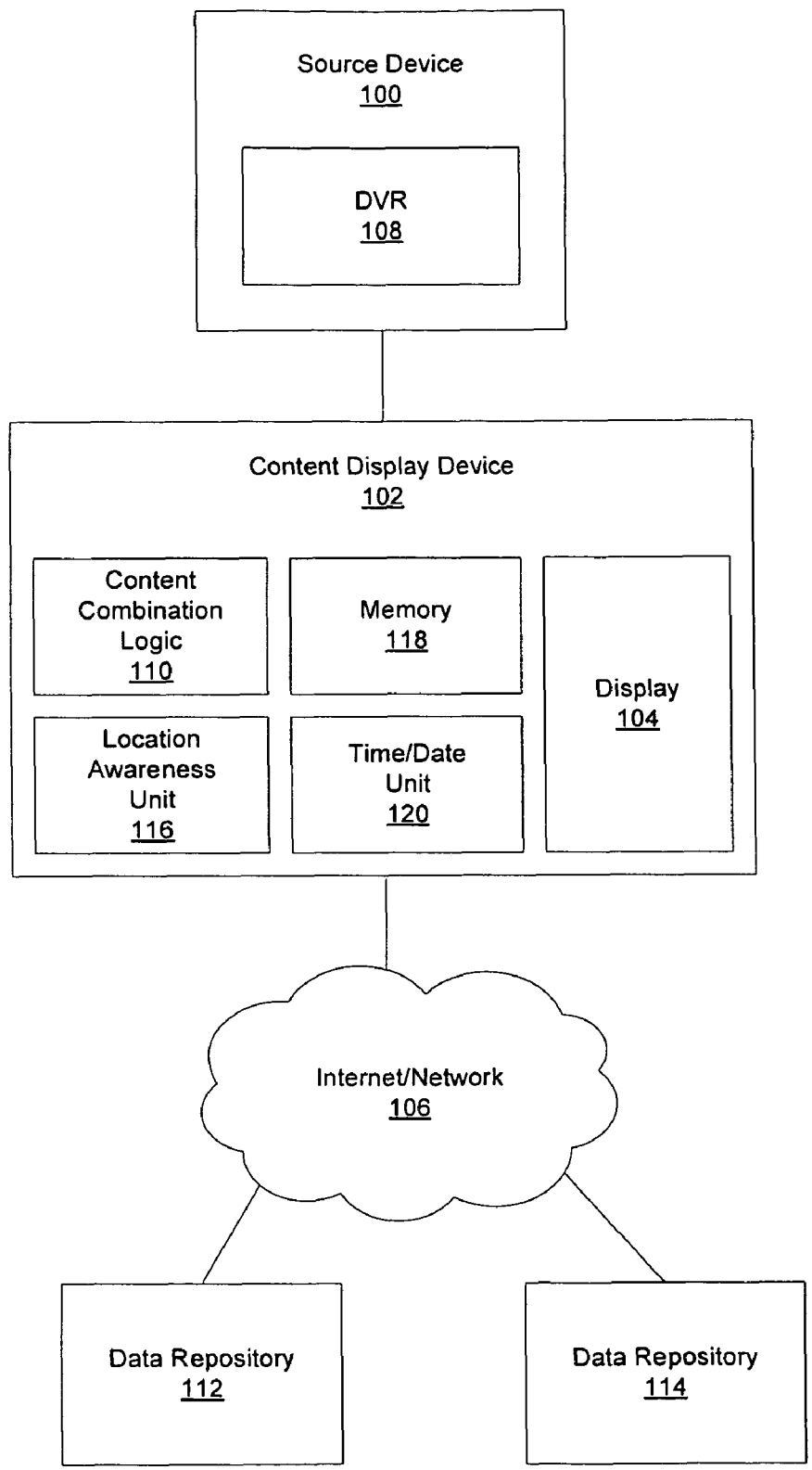
FIG. 1 illustrates an embodiment of a system and apparatus to derive content related to a multimedia stream and dynamically combine and display the stream with the related content.

FIG. 1 illustrates an embodiment of a system and apparatus to derive content related to a multimedia stream and dynamically combine and display the stream with the related content.

A source device 100 is shown coupled to a content display device 102. The source device 100 may be a set top box on a television, a media center home computer, a media server, or any other type of device that may provide video and/or other streaming content. The source device may be coupled to the content display device 102 by one or more types of links (i.e. interconnects, busses, etc.). For example, the link may be a coaxial cable link, which is a standard link coupling a set top box to a television set or other display device. Other examples of the link may be an HDMI (High Definition Multimedia Interface) cable, a Universal Serial Bus (USB) cable, a set of component video cables, or a proprietary link. In other embodiments, the link coupling the source device 100 to the content display device 102 may be a wireless link utilizing one or more wireless protocols such as an IEEE (Institute of Electrical and Electronics Engineers) 802.11-based protocol.

The content display device 102 includes a display 104 in the embodiment shown in FIG. 1. In different embodiments, the content display device 102 may be a portable or non-portable device. For example, portable versions of the device may include a laptop computer, a handheld computer, a cellular phone, a portable gaming console, a portable entertainment device such as an Apple® IPod, or any other portable audio visual device capable of displaying visual images and video through a display. Non-portable versions of the device may include desktop or workstation computers as well as large televisions, among other devices. The display 104 may be an integrated LCD (liquid crystal display), LED (light emitting diode) display, a display projector, or any other type of display. The size of the display 104 may dictate whether the content display device 102 is essentially portable in nature.

The content display device 102 may be coupled to the Internet or a network 106, in many embodiments, through a wireless or wired network connection. For example, in wireless cases, the content display device may wirelessly send and receive data to and from the Internet/network 106 through the use of a wireless protocol such as an 802.11-based protocol (also mentioned above), a high speed cellular protocol such as 3G or greater, the WiMAX protocol, or another wireless protocol capable of 2-way data transfer. If the content display device 102 is not portable, the coupling mechanism to the Internet/network 106 may more likely be a wired coupling, such as through an Ethernet connection. Although, in other embodiments, wireless devices may also occasionally plug into a network through a wired cable and non-portable devices may also include wireless network connections. Thus, any combination of wired or wireless connections to the Internet/network 106 from a portable or non-portable content display device 102 is possible.

The source device 100 may stream multimedia data to the content display device 102. Multimedia data may include an audio data stream, a video data stream, as well as additional information related to the audio and video data streams (such as program information). The multimedia stream may be in any valid multimedia format. For example, the multimedia stream could comprise a stream of video frames in MPEG-2 format. Additionally, the multimedia stream may individual images, text data, and potentially other types of data as well. For example, in the case of a set top box streaming to a television, the set top box may receive cable television or satellite television transmissions of one or more television stations and stream the transmission as multimedia data to the content display device 102. Additionally, in some embodiments, the source device 100 may stream live multimedia data to the content display device 102 that it receives in real-time from a provider (e.g. a feed from a satellite owned by a satellite television provider). In other embodiments, the source device 100 may stream recorded data it is storing internally such as a television program stored in a digital video recorder (DVR) 108 located in the source device 100. In yet other embodiments, the source device may retrieve the multimedia stream from an external storage device, such as from a digital video disk (DVD) or an external Flash memory storage drive.

Figure 5:
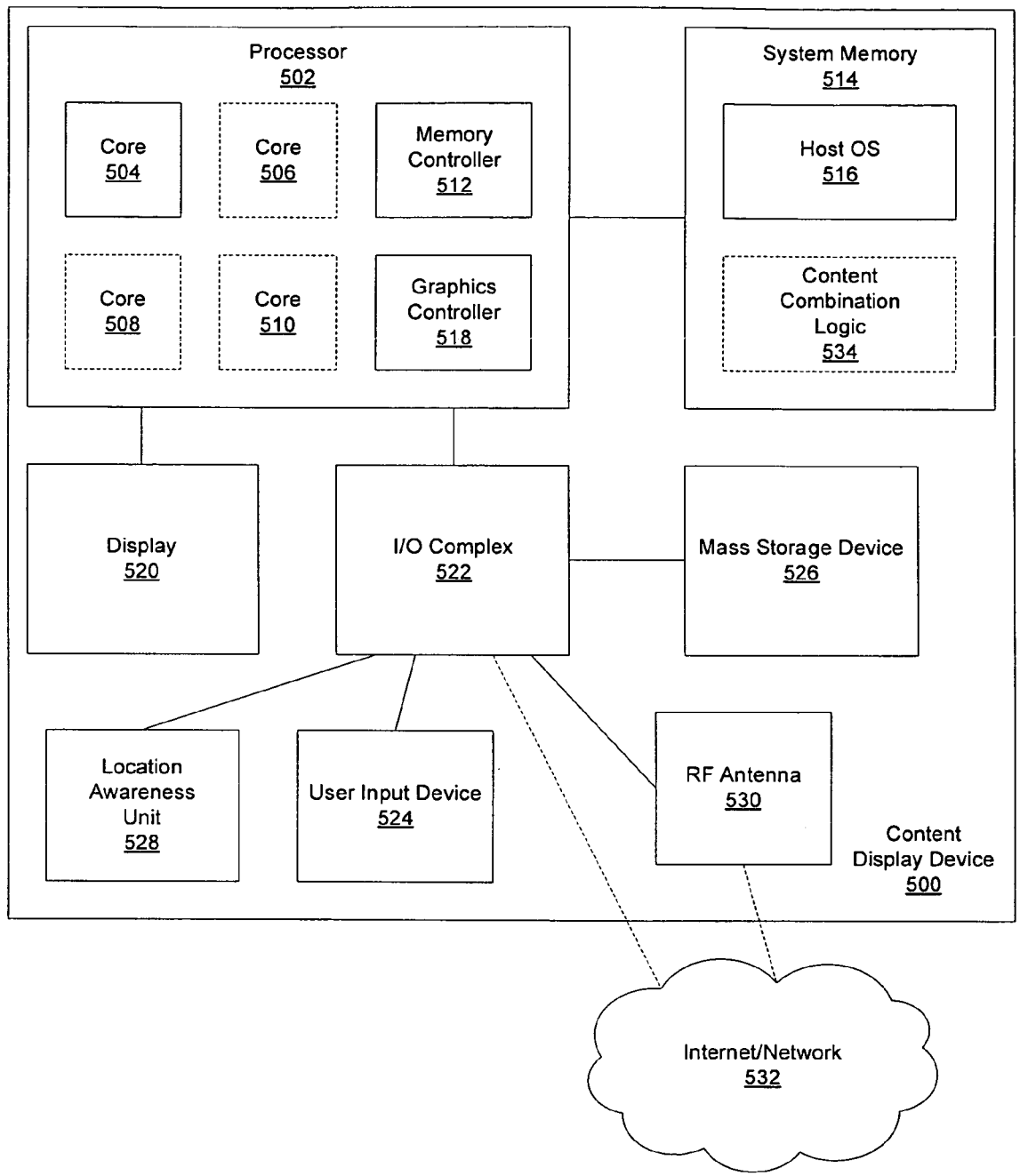
FIG. 5 illustrates an embodiment of the content display device described from FIG. 1.

Content combination logic 110 located within the content display device 102 in the embodiment illustrated in FIG. 1 may receive this multimedia data. The content combination logic 110 may include software logic and hardware circuitry logic. For example, the content combination logic 110 may include a software application running within a memory in the content display device 102 and being executed by a processor in the content display device 102. An embodiment of the internal layout of the content display device 102 is shown in FIG. 5.

Returning to FIG. 1, the content combination logic 110 may include one or more content awareness algorithms to search for information regarding specific content in a multimedia stream sent from the source device 100 (as a live stream or a recorded stream within a stored file). The content combination logic 110 may retrieve content information from a multimedia stream and/or other data received from the source device and create a combination of the received stream from the source device 100 and additional relational information retrieved from one or more additional data sources.

The specific content information related to the stream may include the name of a show displayed in the stream, the names of the actors and actresses in the show, the geographical location where the show takes place, the genre of the show, the length of the show, and a synopsis of the show, among other pieces of information. This information may be stored as meta data attached to the stream being sent to the content display device 102 or it may be provided separately from the stream in a file or other mechanism by the provider of the stream prior to when the stream is sent.

Additionally, beyond standard meta data retrieved from the stream or from separate data files related to the stream, the content combination logic 110 may also retrieve information related to the stream in other methods. For example, individual video frames of the stream may be parsed through facial recognition software and compared to a database of famous actors, sports stars, politicians, and other celebrities to otherwise determine the identity of one or more people in the show. Additionally, famous landmarks may also be able to be parsed out of video frames. Furthermore, speech recognition software may analyze the audio stream to make out any common names, places, and activities discussed in the show.

All or at least a portion of the content data derived from the stream (including meta data, file data, audio data, video data, etc.) may be utilized by the one or more content awareness algorithms to discern content from the stream. In different embodiments, the one or more content awareness algorithms may perceive related patterns of data (content information) and utilize the pattern to produce relevant information related to the stream. For example, the meta data may include the term "desert," the speech recognition software may pull the term "Africa" from a voice in the stream, and the visual recognition might discern sand dunes. These three pieces of related information (a "pattern"—desert, Africa, sand dunes) may provide the result "Sahara." This may be thought of as a keyword the content combination logic discovered using a relational search content awareness algorithm.

In some embodiments, a content awareness algorithm may utilize local databases to come up with results. In other embodiments, the algorithm may access one or more remote data repositories (e.g. 112 and 114) through the Internet/network 106. These repositories may be constructed to assist in specific content searches of one or more types of data. For example, a repository might consist of a remote server connected to a common network or the Internet that is a file server or a search service/server. Additional elements may be utilized to provide additional content keywords and/or other patterns of multiple content elements. For example, the content display device may include a location awareness unit 116 that can pinpoint the geographic location of the content display device 102. The location awareness unit 116 may utilize global positioning system (GPS) or other location-based technology to determine the specific geographic location of the content display device.

Although this may be more commonly useful in a dynamically changing location environment, such as with a portable content display device 102, this would also work to allow the content combination logic 110 to further determine the location of the media market that a non-portable content display device 102 is located within.

In many embodiments, the content combination logic 110 stores the viewing history of the user of the content display device 102 within a memory 118. The user history may include the specific multimedia streams that are requested to be sent from the source device 100 to the content display device 102, the time and date the streams are sent (provided by a time/date unit 120), the geographic location the user watches the stream (provided by the location awareness unit 116). Furthermore, the content combination logic 110 may save a history of patterns and keywords the content awareness algorithm has manufactured. This saved history of relational patterns and keywords may be associated with the specific stream (i.e. shows, programs, events, etc.) the user watched when the patterns and keywords were created. Thus a repeat viewing of the specific stream would not require an intensive initial lookup process by the content awareness algorithm to reproduce the same (or similar) patterns and keywords. This would also allow an algorithm to form a profile of a user's interests from which it can generate a list of possible media recommendations for later viewing from broadcast listings, the user's DVR, the user's media server, or from websites or services on the Internet.

Once a content awareness algorithm discerns relevant content information related to the multimedia data stream received from the source device 100, the content combination logic 110 may provide additional content to be displayed with the streamed content. This additional content (e.g. relational information—information related to the original content) may be collected from the source device 100, from memory 118 or other storage locations within the content display device 102 itself, or from one or more remote data repositories located on the Internet/network 106, among other locations. The additional content may be collected utilizing the content patterns and/or keywords extracted from the original stream by the content awareness algorithm. These patterns and/or keywords may be used as terms for searching for this additional content.

The additional relational information displayed with the user-selected multimedia stream from the source device 100 may enhance the user's experience of the original stream. For example, a user may be watching a multimedia stream of a game their favorite basketball team is playing. The content combination logic 110 may assume that this particular basketball team is the user's favorite because the user watches this basketball team play more than any other (using saved past viewing habit information from the memory 118). The basketball team may be based in a different city than the city the user is located (the city the user is located may be discerned the location awareness unit 116). The content awareness algorithm may utilize this relational information (i.e. basketball team name, user's geographical location) to look up the schedule of the basketball team and provide the user with information regarding their next road game when they are visiting a local basketball team in the user's city. The content combination logic 110 may also pull a dynamically updating live box score of the current game being watched. This additional box score and upcoming schedule relational information may be displayed alongside the streaming basketball game.

Another example might include the user watching a program about the pyramids of Egypt, the content awareness algorithm may determine the show is about the pyramids by one or more methods and the content combination logic 110 may then look up (e.g. on the Internet) relational information regarding a local museum's exhibiting schedule, the website of the channel providing the program about the pyramids with additional information about the show, an online forum about the pyramids for enthusiasts, and information about a public lecture on the pyramids to be given at a local university.

The original requested multimedia stream may be in one portion of the display 104 and the additional relational information may be in other portions of the display 104. The combination of the user requested original content stream and the additional content provided by the content combination logic 110 may give the user a more thorough multimedia experience. Additionally, the display may be interactive in many embodiments, allowing the user to actively participate in responding to and modifying the entirety of the content being displayed. The user may search for more information within one or more of the displays of relational information displayed. When the user does interact with the content, the content combination logic 110 may save these interactions to determine more specific user preferences for future combinations of content. For example, regarding the basketball game, the user might frequently interact with the box score to see specific player updates, but never interact with the schedule. This may afford a more prominent display of the box score during a viewing of the next basketball game with a consequently less prominent (or non-existent) display of the local schedule of the basketball team.

In many embodiments, the content combination logic 110 may additionally send information related to user viewing and interacting habits associated with the combined content displayed on the display 104 to a remote service across the Internet/network 106. This remote service may be a social network or other type of website. For example, a user may watch movies frequently on the content display device 102. As a result, the content combination logic 110 may send information regarding the latest five movies the user has watched (title, an interactive "like it/don't like it" rating from the user, actors in each movie, etc.) to their Facebook webpage so the user's friends can see.

Figure 2:
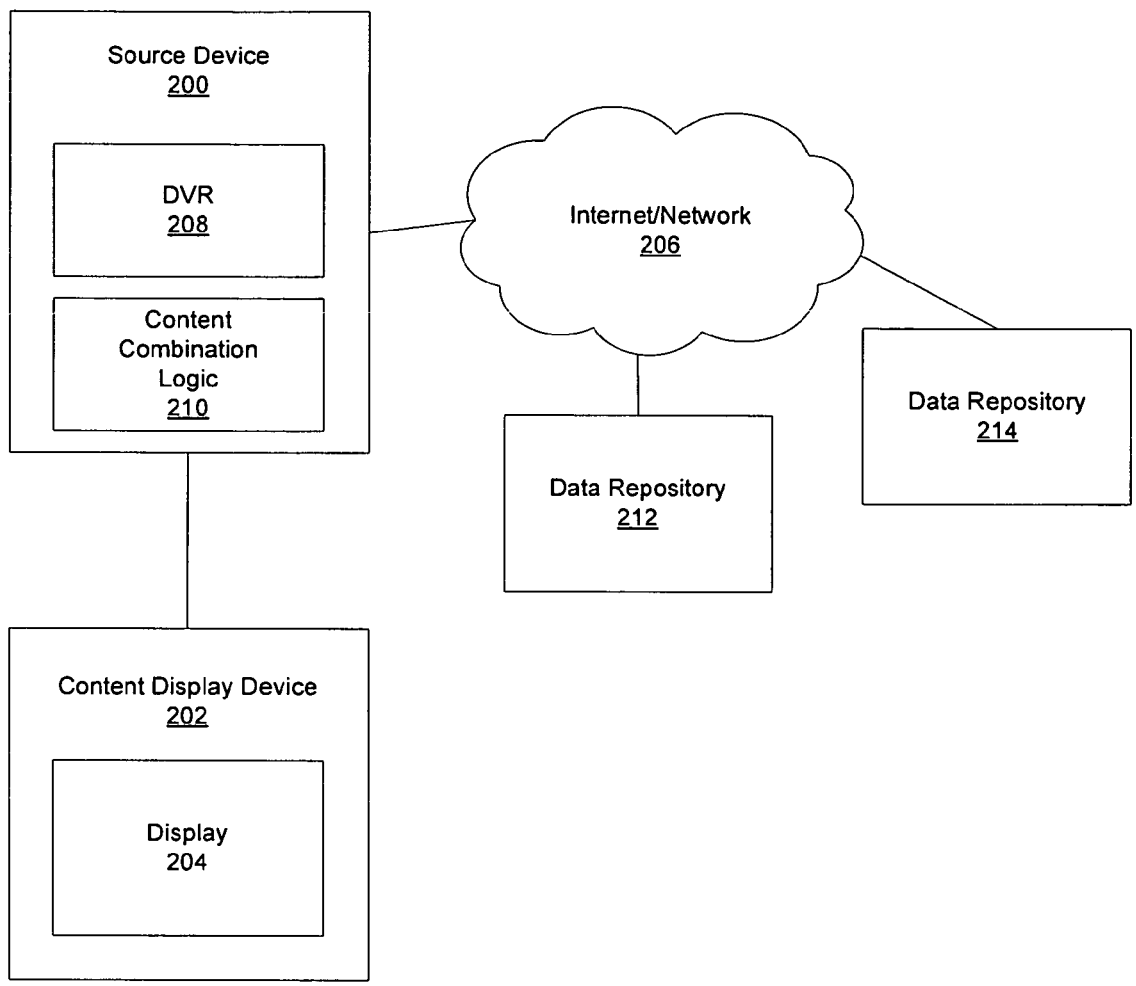
FIG. 2 illustrates another embodiment of a system and apparatus to derive content related to a multimedia stream and dynamically combine and display the stream with the related content.

FIG. 2 illustrates another embodiment of a system and apparatus to derive content related to a multimedia stream and dynamically combine and display the stream with the related content.

A source device 200 is shown coupled to a content display device 202. The source device 200 may be a set top box on a television, a media center home computer, a media server, or any other type of device that may provide video and/or other streaming content. The content display device 202 includes a display 204 in the embodiment shown in FIG. 2. In different embodiments, the content display device 102 may be a portable or non-portable device.

In the embodiment illustrated in FIG. 2, the source device 200 may be coupled to the Internet or a network 206, through a wireless or wired network connection. The source device 200 may stream multimedia data to the content display device 202. Multimedia data may include an audio data stream, a video data stream, as well as additional information related to the audio and video data streams (such as program information). Additionally, the multimedia stream may individual images, text data, and potentially other types of data as well.

Additionally, in some embodiments, the source device 200 may stream live multimedia data to the content display device 202 that it receives in real-time from a provider. In other embodiments, the source device 200 may stream recorded content it is storing internally such as a television program stored in a DVR 208 located in the source device 200.

In the embodiment illustrated in FIG. 2, content combination logic 210 is located within the source device 200. The content combination logic 210 may include software logic and hardware circuitry logic. For example, the content combination logic 210 may include a software application running within a firmware storage module in the source device 200. In certain embodiments, the content combination logic 210 may include all or most of the same logic associated with content combination logic 110 (in FIG. 1). The difference being the content combination logic 210 in FIG. 2 is located internally within the source device 200.

The functionality of the content combination logic 210 may include the same or similar one or more content awareness algorithms, as described above in regard to FIG. 1, to search for patterns and keywords within the multimedia data streams sent from the source device 200. Specifically, the content combination logic 210 may determine to send additional relational data with the stream sent from source device 200 to content display device 202. The content combination logic 210 may receive user input in response to the additional relational data sent from the source device 200. Thus, the link between the source device 200 and the content display device 202 may include bidirectional data streams. In other words, the original multimedia stream along with any relational data may be sent from the source device 200 to the content display device 202 and user input/feedback may be sent from the content display device 202 back to the source device 200. The user input/feedback may be utilized by the content combination logic 210 to customize any further relational data sent from the source device 200 to the content display device.

With at least a portion of the content combination logic 210 located in the source device 200, there may be a direct coupling from the source device 200 to the Internet/network 206. Embodiments that have the source device 200 directly coupled to the Internet/network 206 (as opposed to the source device 200 indirectly coupled to the Internet/network 206 through the content display device 202) potentially allow a more efficient direct search of one or more data repositories (e.g. 212 and 214).

Figure 3:
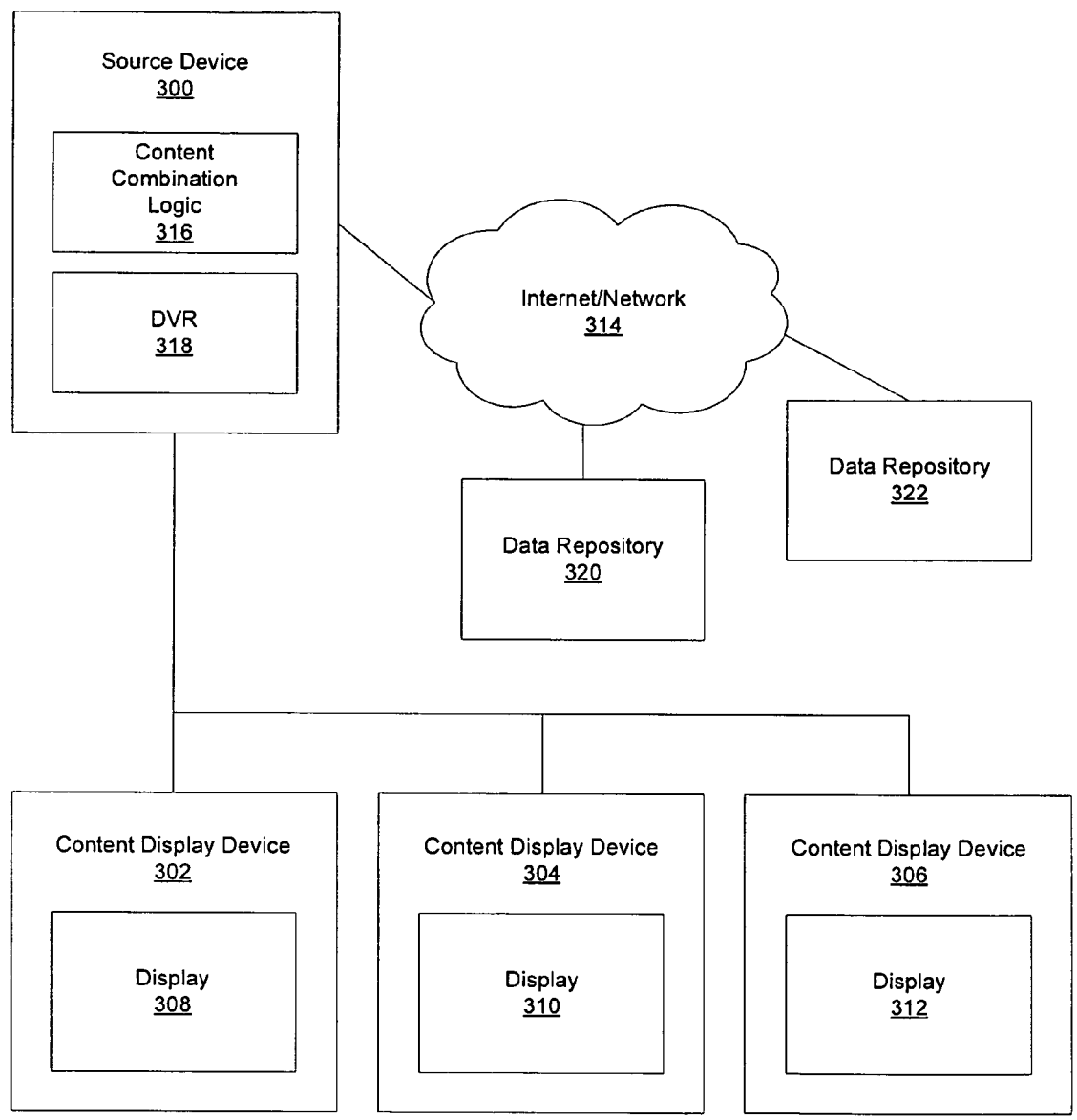
FIG. 3 illustrates an additional embodiment of a system and apparatus to derive content related to a multimedia stream and dynamically combine and display the stream with the related content.

FIG. 3 illustrates an additional embodiment of a system and apparatus to derive content related to a multimedia stream and dynamically combine and display the stream with the related content.

A source device 300 is shown coupled to multiple content display devices (302, 304, and 306). The source device 300 may be a set top box on a television, a media center home computer, a media server, or any other type of device that may provide video and/or other streaming content. The content display devices 302-306 include displays (308, 310, and 312) in the embodiment shown in FIG. 3. In different embodiments, the content display devices 302-306 may be portable or non-portable devices.

The major difference between the embodiment illustrated in FIG. 2 and the embodiment illustrated in FIG. 3 is number of content display devices. Although FIG. 2 is shown as limited to one content display device, FIG. 3 includes three content display devices. In reality, there may be embodiments in any discussed figure that include more than one content display device. For example, a retail or professional business establishment may have several content display devices that are all being fed by the same source device. In some embodiments, it is possible that a user may provide input from one or more of the content display devices. In other embodiments, a user may provide input directly to the source device 300.

In the embodiment illustrated in FIG. 3, the source device 300 may be coupled to the Internet or a network 314 through a wireless or wired network connection. The source device 300 may stream multimedia data to the content display devices 302-306. Multimedia data may include an audio data stream, a video data stream, as well as additional information related to the audio and video data streams (such as program information). Additionally, the multimedia stream may individual images, text data, and potentially other types of data as well.

Additionally, in some embodiments, the source device 300 may stream live multimedia data to the content display devices 302-306 that it receives in real-time from a provider. In other embodiments, the source device 300 may stream recorded content it is storing internally such as a television program stored in a DVR 308 located in the source device 300.

In the embodiment illustrated in FIG. 3, content combination logic 316 is located within the source device 300. The content combination logic 316 may include software logic and hardware circuitry logic. For example, the content combination logic 316 may include a software application running within a firmware storage module in the source device 300. In certain embodiments, the content combination logic 316 may include all or most of the same logic associated with content combination logic 110 (in FIG. 1).

The functionality of the content combination logic 316 may include the same or similar one or more content awareness algorithms, as described above in regard to FIG. 1, to search for patterns and keywords within the multimedia data streams sent from the source device 300. Specifically, the content combination logic 316 may determine to send additional relational data with the stream sent from source device 300 to content display devices 302-306.

The content combination logic 316 may receive user input in response to the additional relational data sent from the source device 300. Thus, the link between the source device 300 and the content display devices 302-306 may include bidirectional data streams. The original multimedia stream along with any relational data (retrieved by the content combination logic 316) may be sent from the source device 300 to the content display devices 302-306 and user input/feedback may be sent from any of the content display devices 302-306 back to the source device 300. The user input/feedback may be utilized by the content combination logic 316 to customize any further relational data sent from the source device 300.

In many embodiments, content combination logic may include separate logic per content display device. Thus, there may be logic to send different multimedia streams and different sets of relational data to each of content display devices 302, 304, and 306. Thus, content combination logic 316 may separately receive and utilize user input/feedback from each of content display devices 302, 304, and 306.

With at least a portion of the content combination logic 316 located in the source device 300, there may be a direct coupling from the source device 300 to the Internet/network 314.

Figure 4:
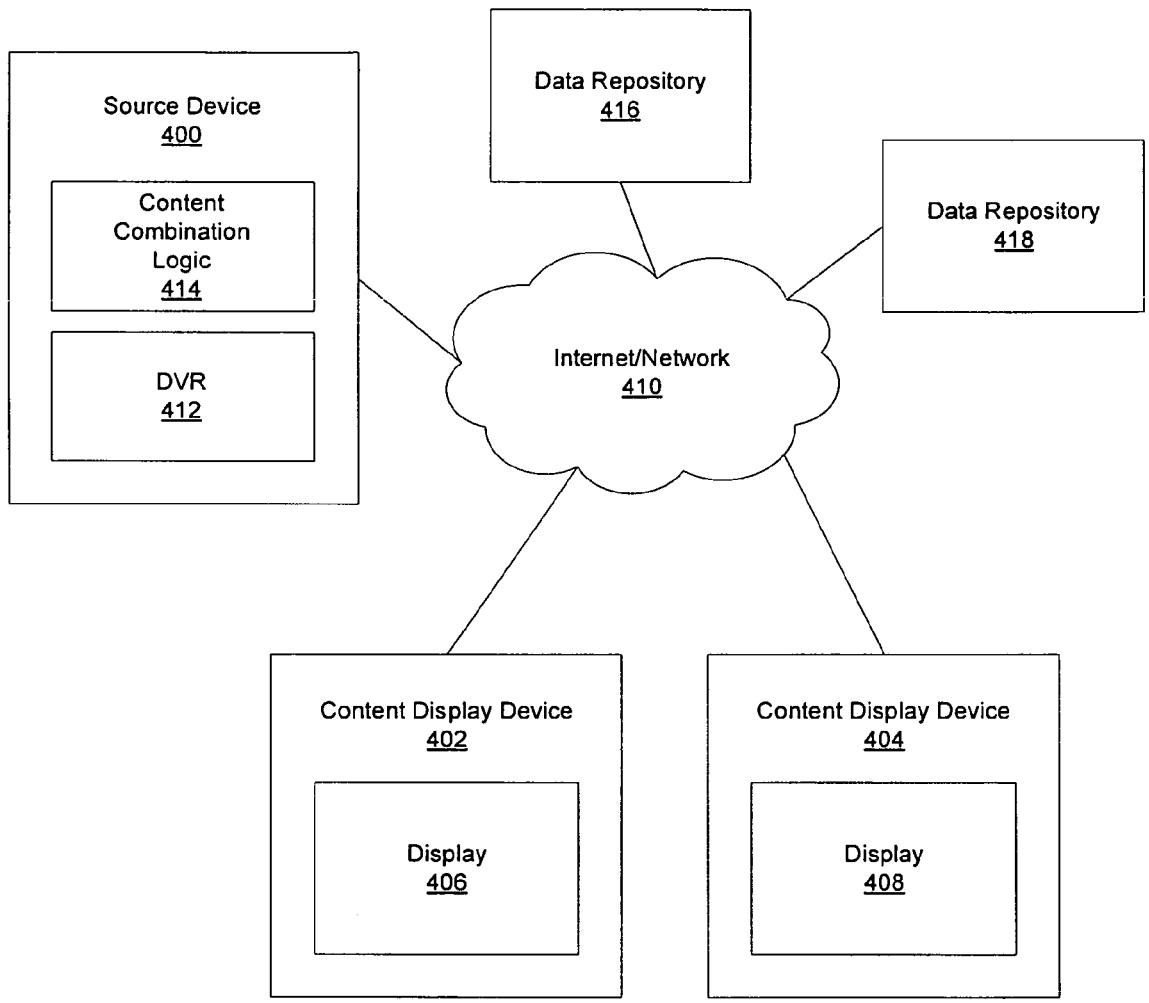
FIG. 4 illustrates yet another embodiment of a system and apparatus to derive content related to a multimedia stream and dynamically combine and display the stream with the related content.

FIG. 4 illustrates yet another embodiment of a system and apparatus to derive content related to a multimedia stream and dynamically combine and display the stream with the related content.

A source device 400 is shown coupled to multiple content display devices (402 and 404). The source device 400 may be a set top box on a television, a media center home computer, a media server, or any other type of device that may provide video and/or other streaming content. The content display devices 402 and 404 include displays (406 and 408) in the embodiment shown in FIG. 4. In different embodiments, the content display devices 402 and 404 may be portable or non-portable devices.

In FIGS. 1-3, the source device is coupled directly to the one or more content display devices. This coupling, as discussed above in regard to FIG. 1, may be through a coaxial cable, USB cable, component cable, or another type of standard video transmission cable. Alternatively, as illustrated in the embodiment in FIG. 4, the coupling between the source device 400 and the one or more content display devices (e.g. 402 and 404) may be of a more remote nature, such as through Internet/network 410. Thus, the source device 400 may stream multimedia content across the Internet/network 410 to one or more content display devices 402 and 404. For example, a user may watch a streaming video on a portable content display device, such as a phone, and the stream may originate from the source device 400 in the user's home.

In the embodiment illustrated in FIG. 4, the source device 400 may be coupled to the Internet or a network 410 through a wireless or wired network connection. Additionally, the source device 400 may stream live multimedia data or recorded multimedia data (stored in the DVR 412) to the content display devices 402 and 404.

The content combination logic 414 may be located within the source device 400. In certain embodiments, the content combination logic 414 may include all or most of the same logic associated with content combination logic 110 (in FIG. 1). The functionality of the content combination logic 414 may include the same or similar one or more content awareness algorithms, as described above in regard to FIG. 1, to search for patterns and keywords within the multimedia data streams sent from the source device 400. Specifically, the content combination logic 414 may determine to send additional relational data with the stream sent from source device 400 to content display devices 402 and 404.

The content combination logic 414 may receive user input in response to the additional relational data sent from the source device 400. Thus, bidirectional data streams may be passing between the source device 400 and the content display devices 402 and 404. The original multimedia stream along with any relational data (retrieved by the content combination logic 414) may be sent from the source device 400 to the content display devices 402 and 404 and user input/feedback may be sent from any of the content display devices 402 and 404 back to the source device 400. The user input/feedback may be utilized by the content combination logic 414 to customize any further relational data sent from the source device 400.

In many embodiments, content combination logic may include separate logic per content display device. Thus, there may be logic to send different multimedia streams and different sets of relational data to each of content display devices 402 and 404. Thus, content combination logic 414 may separately receive and utilize user input/feedback from each of content display devices 402 and 404.

FIG. 5 illustrates an embodiment of the content display device described from FIG. 1.

The content display device 500 may include one or more processors such as processor 502. Processor 502 may have one or more cores such as core 504 and additional cores 506, 508, and 510 (i.e. for a 4-core processor). Though, processor 502 may alternatively have 1, 2, 8, 16, or another number of cores.

Processor 502 may be an Intel®-based central processing unit (CPU) or another brand CPU. Each processor core may include several internal operational units such as execution units and instruction retirement units. Also, each core may also include several internal memory locations utilized to store data, such as registers and caches.

Processor 502 may be coupled to a memory subsystem through memory controller 512. Although FIG. 5 shows memory controller 512 integrated into processor 502, in other embodiments that are not shown, the memory controller may be integrated into a bridge device or other integrated circuit in the computer system that is discrete from processor 502. The memory subsystem includes system memory 514 to store instructions to be executed by the processor. The memory devices in the memory subsystem may be any type of volatile dynamic random access memory (DRAM), for example double data rate (DDR) synchronous DRAM, and/or any type of non-volatile memory, for example a form of Flash memory. The processor(s) is coupled to the memory by a processor-memory interface, which may be a link (i.e. an interconnect/bus) that includes individual lines that can transmit data, address, control, and other information between the processor(s) and the memory.

A host operating system (OS) 516 is representative of an operating system that would be loaded into the memory of the content display device 500 while the device is operational to provide general operational control over the platform and any peripherals attached to the platform. The host OS 516 may be a form of Microsoft® Windows®, UNIX, LINUX, or any other functional OS. The host OS 516 provides an environment in which one or more programs, services, or agents can run within. In many embodiments, one or more software applications may be running on top of the host OS 516. The application may be any type of software application that performs one or more tasks while utilizing resources.

Processor 502 may also include an integrated graphics controller 518. In other embodiments, the graphics controller may be in an integrated circuit that is discrete from processor 502. The graphics controller 518 may include one or more graphical processing units that are specifically designed to generate video frames and other imagery to be displayed. The graphics controller 518 may cause processor 502 to stream graphical content to a display 520 within the content display device. In different embodiments, the display 520 may be a liquid crystal display (LCD), a light emitting diode (LED) display, a cathode ray tube (CRT) display, a plasma display, a projection unit, or any other type of display.

The content display device may also include an input/output (I/O) logic complex 522. The I/O complex 522 may include one or more integrated controllers for managing portions of an I/O subsystem within the content display device 500. For example, the I/O complex 522 may include one or more integrated Universal Serial Bus (USB) host controllers (not shown) to control the flow of information between the processor and one or more USB devices that may be plugged into the content display device 500.

In many embodiments, a user input device (such as device 524) is coupled to the I/O complex 522. There may be a user input device controller within the I/O complex to couple processor 502 to a user input device. Examples of user input devices are remote controls, keyboards, mice, touch screens, motion sensors, microphones, etc. Although not shown, there may be several user input controllers controlling several user input devices.

A mass storage device 526 also may be coupled to I/O complex 522 to store data. For example, when the content display device 500 is powered off, the mass storage device may store the host OS 516. In many embodiments, the content display device includes a DVR, which may store video in the mass storage device 526. Once again, a mass storage device controller may be integrated into the I/O complex 522 to control the mass storage device 526.

The content display device 500 may also include a location awareness unit 528. The location awareness unit 528 may be a GPS device or another device capable of providing the dynamic geographical position of the content display device 500.

Additionally, the I/O complex 522 may also be coupled to a radio frequency (RF) antenna 530. The RF antenna 530 may allow the content display device 500 to communicate wirelessly with one or more networks or the Internet, such as Internet/network 532. In alternative embodiments, the I/O complex 522 has an integrated Ethernet or other hardwired network interface to allow coupling to the Internet/network 532.

The I/O complex 522 may also include a module that can keep time and date information (not shown). This module may include a battery backup system to allow the time and date information to be kept whether or not the content display device is powered on or off.

In some embodiments, content combination logic 534 is located within a software program running within system memory 514 when the content display device is powered on. In other embodiments that are not pictured, content combination logic 534 may be stored within firmware in processor 502, I/O complex 522, or in another location within content display device 500. In yet other embodiments, content combination logic 534 may be implemented in hardware circuitry within processor 502, I/O complex 522, or elsewhere within content display device 500.

Although FIG. 5 describes the content display device from FIG. 1, in many other embodiments FIG. 5 may also describe the source device similarly (from FIGS. 2-4). For example, the source device may include a processor, system memory, an I/O complex, and a mass storage device (e.g. the storage for a DVR). In many of these embodiments, the display device 518 shown in FIG. 5 may be removed (to be implemented in a content display device remote from the source device) or it may comprise a more rudimentary liquid crystal display LCD device to show the tuned channel number or other basic information. In these embodiments, the I/O complex 520 may also be coupled to one or more coaxial, component, USB, and/or other cable interfaces to allow a multimedia stream to be transmitted to a display device.

Figure 6:
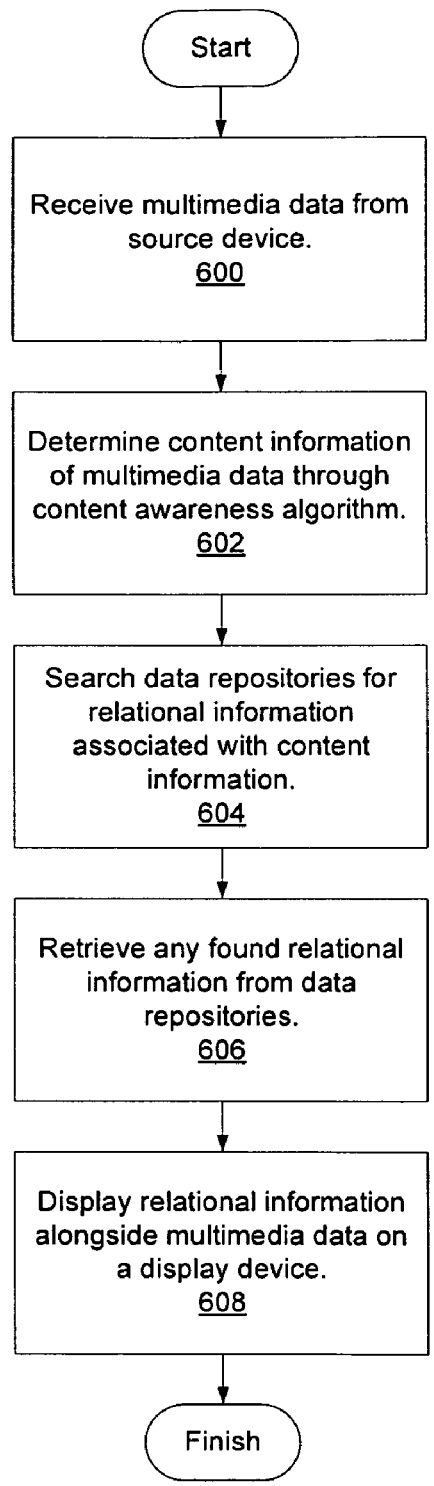
FIG. 6 is a flow diagram of an embodiment of a process to derive content related to a multimedia stream and dynamically combine and display the stream with the related content.

FIG. 6 is a flow diagram of an embodiment of a process to derive content related to a multimedia stream and dynamically combine and display the stream with the related content. The process may be performed by hardware (e.g. circuitry, etc.), software (e.g. an application program, etc.), or a combination of both. The process begins by processing logic receiving a multimedia data stream from a source device (processing block 600). The stream may be a live stream received from a content provider source (such as a cable television transmission from the provider), or it may be a saved stream retrieved from a storage location (such as from a DVR).

Next, processing logic determines one or more pieces of content information of the received multimedia data through a content awareness algorithm (processing block 602). There may be one or more content awareness algorithms. Each algorithm may allow one or more types of content awareness among many kinds, such as speech recognition, face recognition, location recognition, printed word recognition, etc. In many embodiments, these algorithms may choose to utilize frequencies of word usage to determine content. In other embodiments, two or more words, sounds, symbols, images, or other types of data may relate to each other, which may allow pattern awareness.

Then, processing logic searches one or more data repositories for relational information associated with the content information (processing block 604). The relational information may come from repositories of data stored remotely on the Internet, stored locally to the hardware utilizing the processing logic, or anywhere in between.

Next, processing logic retrieves found relational information determined to be relevant to the multimedia stream (and potentially relevant to the specific user watching the multimedia stream) (processing block 606). Finally, upon retrieving the relational information determined to be relevant, processing logic displays the relational information with the multimedia data on a display device (processing block 608) and the process is complete. The retrieved relational information may be displayed dynamically alongside a live stream. Otherwise, for a recorded stream (such as one saved within a DVR), the relational information may be retrieved and stored with the stored stream and displayed at a later time when the user decides to watch the saved stream.

Thus, embodiments of a method, system, and apparatus to derive content related to a multimedia stream and dynamically combine and display the stream with the related content are described. These embodiments have been described with reference to specific exemplary embodiments thereof. It will be evident to persons having the benefit of this disclosure that various modifications and changes may be made to these embodiments without departing from the broader spirit and scope of the embodiments described herein. The specification and drawings are, accordingly, to be regarded in an illustrative rather than a restrictive sense.

What is claimed is:

1. A method, comprising:
  receiving multimedia data from a source device, the multimedia data including content and metadata associated with the content;
  determining first content information from the metadata of the received multimedia data;
  determining second content information from the content of the received multimedia data;
  generating third content information as a function of the first content information and the second content information using a content awareness algorithm;
  searching one or more data repositories for relational information associated with the third content information;
  retrieving any found relational information from the one or more data repositories; and
  displaying the retrieved relational information alongside the multimedia data on a display device.

2. The method of claim 1, further comprising:
  saving received input from a user responding to at least a portion of the displayed relational information;
  associating the received input with the generated third content information; and
  utilizing the association of the received input with the determined content for subsequent relational information searches.

3. The method of claim 1, wherein generating the third content information comprises:
  associating one or more patterns of determined content information to the multimedia data through the content awareness algorithm; and
  utilizing the one or more patterns to assist in searching for the relational information.

4. The method of claim 3, further comprising:
  determining a geographical location of the display device; and
  utilizing the geographical location of the display device to assist in searching for the relational information.

5. The method of claim 4, further comprising:
  saving a history of the associated patterns with a localized time and the display device location information; and
  utilizing the saved pattern history to suggest to a user one or more future viewings of multimedia data and relational information to be displayed on the display device.

6. The method of claim 1, further comprising:
  dynamically posting at least a portion of the content information to a network-accessible website.

7. A system, comprising:
  a source device to send multimedia data to a display device, the multimedia data including content and metadata associated with the content;
  the display device to
    receive the multimedia data to display;
    determine first content information from the metadata of the received multimedia data;
    determine second content information from the content of the received multimedia data;
    generate third content information as a function of the first content information and the second content information;
    search one or more data repositories for relational information associated with the third content information;

retrieve any found relational information from the one or more data repositories; and display the retrieved relational information alongside the multimedia data.

8. The system of claim 7, wherein the display device is further operable to:

save received input from a user responding to at least a portion of the displayed relational information;

associate the received input with the generated third content information; and utilize the association of the received input with the determined content for subsequent relational information searches.

9. The system of claim 7, wherein the display device is further operable to:

associate one or more patterns of determined content information to the multimedia data through the content awareness algorithm; and utilize the one or more patterns to assist in searching for the relational information.

10. The system of claim 9, wherein the display device is further operable to:

determine a geographical location of the display device; and utilize the geographical location of the display device to assist in searching for the relational information.

11. The system of claim 10, wherein the display device is further operable to:

save a history of the associated patterns with a localized time and the display device location information; and utilize the saved pattern history to suggest to a user one or more future viewings of multimedia data and relational information to be displayed on the display device.

12. The system of claim 7, wherein the display device is further operable to:

dynamically post at least a portion of the content information to a network-accessible website.

13. An apparatus, comprising a source device to receive multimedia data from a service provider, the multimedia data including content and metadata associated with the content;

determine first content information from the metadata of the multimedia data;

determine second content information from the content of the received multimedia data;

generate third content information as a function of the first content information and the second content information;

search one or more data repositories for relational information associated with the third content information;

retrieve any found relational information from the one or more data repositories; and send the relational information with the multimedia data to a display device to be displayed.

14. The apparatus of claim 13, wherein the source device is further operable to:

save received input from a user responding to at least a portion of the displayed relational information;

associate the received input with the generated third content information; and utilize the association of the received input with the determined content for subsequent relational information searches.

15. The apparatus of claim 13, wherein the source device is further operable to:

associate one or more patterns of determined content information to the multimedia data through the content awareness algorithm; and utilize the one or more patterns to assist in searching for the relational information.

16. The apparatus of claim 15, wherein the source device is further operable to:

determine a geographical location of the display device; and utilize the geographical location of the display device to assist in searching for the relational information.

17. The apparatus of claim 16, wherein the source device is further operable to:

save a history of the associated patterns with a localized time and the display device location information; and utilize the saved pattern history to suggest to a user one or more future viewings of multimedia data and relational information to be displayed on the display device.

18. The apparatus of claim 13, wherein the source device is further operable to:

dynamically post at least a portion of the content information to a network-accessible website.

19. An apparatus, comprising a display device to:

receive multimedia data from a source device, the multimedia data including content and metadata associated with the content;

determine first content information from the metadata of the received multimedia data;

determine second content information from the content of the received multimedia data;

generate third content information as a function of the first content information and the second content information;

search one or more data repositories for relational information associated with the third content information;

retrieve any found relational information from the one or more data repositories; and display the retrieved relational information alongside the multimedia data.

20. The apparatus of claim 19, wherein the display device is further operable to:

save received input from a user responding to at least a portion of the displayed relational information;

associate the received input with the generated third content information; and utilize the association of the received input with the determined content for subsequent relational information searches.

21. The apparatus of claim 19, wherein the display device is further operable to:

associate one or more patterns of determined content information to the multimedia data through the content awareness algorithm; and utilize the one or more patterns to assist in searching for the relational information.

22. The apparatus of claim 21, wherein the display device is further operable to:

determine a geographical location of the display device; and utilize the geographical location of the display device to assist in searching for the relational information.

23. The apparatus of claim 22, wherein the display device is further operable to:

save a history of the associated patterns with a localized time and the display device location information; and utilize the saved pattern history to suggest to a user one or more future viewings of multimedia data and relational information to be displayed on the display device.

24. The apparatus of claim 19, wherein the display device is further operable to:

dynamically post at least a portion of the content information to a network-accessible website.

* * * * *